United States Patent Office 3,232,682
Patented Feb. 1, 1966

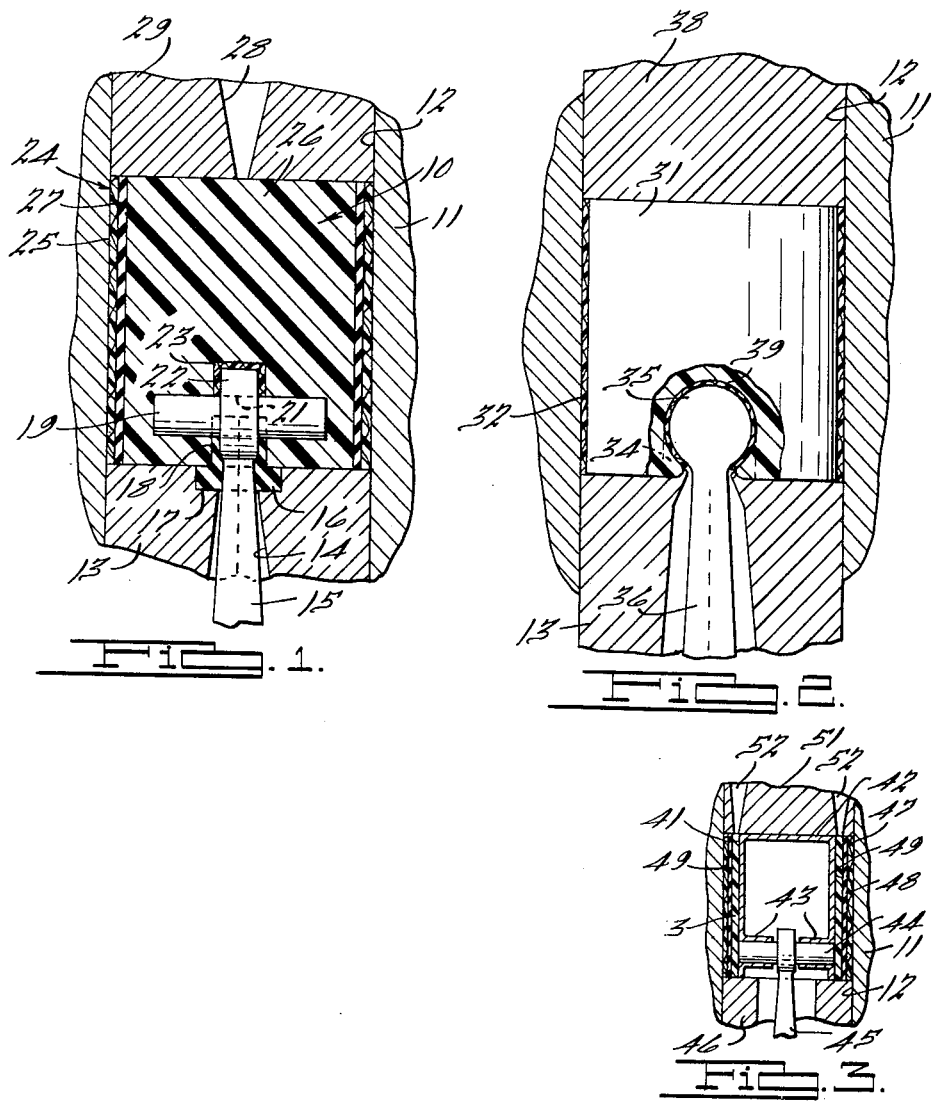

3,232,682
LOW FRICTION SURFACES PROVIDED
UNDER PRESSURE
Charles S. White, Rte. 3, Box 454–H,
Palmdale, Calif.
Application May 8, 1961, Ser. No. 108,610, now Patent
No. 3,125,004, dated Mar. 17, 1964, which is a division
of application Ser. No. 583,680, May 9, 1956. Divided
and this application June 8, 1962, Ser. No. 201,117
13 Claims. (Cl. 308—72)

This invention relates to low friction members and methods of construction and particularly to a low friction resin member which has pressure engagement with a mating member and the methods of constructing such members and is a division of Serial No. 108,610, filed May 8, 1961, now Patent No. 3,125,004, which is a division of Ser. No. 583,680, filed May 9, 1956, now abandoned.

In view of the difficulty of machining, spherical surfaces and sockets to maintain accurate diameter when producing finished mated surfaces, many expedients were employed in the past to provide mated members having accurate dimension and perfect fit between the mating operating surfaces. The connection between ball and socket joints of rod ends was always difficult to construct not only in the assembly of the ball within the socket but also in machining surfaces which were highly polished and which were to be of exact mating diameters.

In rod end applications, one embodiment of the present invention contemplates the use of a low friction material in sleeve form between the central ball and a split raceway. When the raceway is split by a plane perpendicular to the central axis, the two washerlike parts are spaced to provide room to receive the material. The spaced raceway parts are moved toward each other with a predetermined pressure for compacting the material between the ball surface and the surface of the raceways. The ball and raceways may first be heated or heat may be applied to the assembly to form the resin material to the ball and preferably bond the sleeve material to the surface of the raceways. In this asembly only the ball need be polished. The exact diameter of the ball need not be maintained since the forming of the sleeve material will take care of any difference in dimensions while providing engagement between the polished surface and the surface of the low friction resin material under a predetermined pressure. It is within the purview of the invention to split the raceway on the diameter and press the raceways toward each other after the sleeve of low friction resin material has been applied to the ball to compress the material when heated to a formable stage, with a predetermined pressure. After cooling, the material is bonded to the raceway, and a pressure relationship is maintained when the raceway and assembly are press-fitted in a ring of the rod end. With this arrangement, a tight bearing surface is assured having very low friction characteristics which permit use without any play or appreciable wear.

Accordingly, the main objects of the invention are: to provide a low friction layer of resin material which is compacted against a polished surface with which it operates; to form a ball and socket rod end by placing a sleeve of low friction resin material between the ball and the socket which is split into two like parts and moved toward each other to compress the material of the sleeve between the surface of the socket and ball, to the former of which the material is preferably bonded, and, in general, to provide low friction resin surfaces to one of two mated movable parts which is simple in construction and economical of manufacture.

Other objects and features of novelty of the invention will be specifically pointed out or will become apparent when referring for a better understanding of the invention to the following description taken in conjunction with the accompanying drawing, wherein:

FIG. 1 is a sectional view of a rod end showing the elements thereof assembled together prior to the application of heat and pressure to position the elements in final form;

FIG. 2 is a view of the structure illustrated in FIG. 1 after the heat and pressure have positioned the elements in final form, and FIG. 3 is a view of structure, similarly illustrated in FIG. 2 showing another form of the invention.

Referring to FIGS. 1 and 2, a ball and socket rod end is shown which illustrates one embodiment of the present invention. A round segment of a ball 55 with a polished spherical shaped outer surface has end plates 56 applied thereto and placed within a head 57 in the shape of a ring member provided at one end with a rod 58. A pair of annular washerlike raceway or socket elements 59 having arcuate surfaces 61 roughly formed therein are placed within the head against a sleeve of low friction resin material 62. Pressure is applied to both sides of the washerlike element 59 by one or both sleeve elements 63 to force them toward each other and provide a pressure engagement between low friction resin material 62 and the polished surface of the ball. The washerlike element 59 may be made of metal or of the moldable plastic material which forms under heat and pressure to the desired shape. The low friction material is preferably bonded to the arcuate surfaces 61 by the use of "Cycle Weld" sold by Chrysler or "Plastilok" by Goodrich, by the applied heat. When the low friction material is formed when heated, upon cooling a bearing contact with the polished arcuate surface of ball 55 is provided under a predetermined pressure. Flanges 64 are formed on both sides of the head 57 by coining operations for retaining the two washers 59 in adjacent relation to each other. It is to be understood that pressure on the plastic material of the washerlike elements 59 may force them into intimate engagement with each other and with the low friction bearing material with which it bonds.

The sleeve 62 may comprise a film of fluorocarbon such as "Teflon" which forms the inner surface 70 of the sleeve and is secured to a backing material which forms the outer face 71 of the sleeve and is bonded to the surface of the elements 59 or the sleeve 62 may comprise Teflon threads woven into a cloth having bondable cords therein or take any other form as clearly disclosed and described in the following application and patents: the United States patent of Charles S. White, No. 2,804,886, issued Sep. 3, 1957, for Low Friction Fabric Material; the application for United States patent of Charles S. White, Ser. No. 583,657, filed May 9, 1956 for Metal Bearing Having a Low Friction Surface, now abondoned; and the United States patent of Charles S. White, No. 2,907,612, issued Oct. 6, 1959, for Barrier and Bonding Material for Low Friction Surface.

A similar arrangement is illustrated in FIG. 3 wherein the encompassing element 65 of the ball 55 is split on a diameter as at 66 with the two halves forced toward each other against the sleeve of low friction resin material 62. When reference is made herein to the sleeve of the material, it is understood that a piece of material may be employed having the ends in abutting relation to each other as well as a sleeve which is woven or built up as described in the herein set forth application and patents. After pressure is applied between the element 65 the entire assembly is forced within the head 67, one side of which is provided with a flange 68, the other side of which has a flange 69 formed thereon by coining the inner edge of the ring. In a similar manner the element 65 may be made of metal or plastic material such as the material 26 so that it may be forced under heat into exact engagement with the low friction resin material 62 with which it is bonded. It is also within the purview of the invention to close the sides of the ball 55 and the area within the flanges 68 and 69 and force the plastic material 26 into the area within the head 67 to form element 65. In any of the constructions, low friction surfaces are provided against polished surfaces of a mating element by low friction resin materials, preferably of the fluorocarbon types, such as "Teflon," "Kel-F," "Fluorothene," and the like, described in the above-mentioned application and patents. The low friction materials may be backed by a resilient material, such as a layer of rubber to provide flexibility under pressure to the engaged surfaces.

While the invention is herein illustrated as being applied to rod ends, it is to be understood that many other similar applications can be made by the same structures and methods employing pressure to produce engagement between the low friction resin material and the polished surface of the element on which it is to operate. For example, if the two half-cylindrical elements 65 of FIG. 3 contained an internal thread, such thread could be used to mold a thread on a stud, bolt or the like which may have a thread of smaller diameter thereon. The low friction material will fill the space between the threads of the parts when a proper amount is employed. When the stud has a holding relation with the material after it is cured, a complete thread may be made in this manner. Further, when the term "fluorocarbon resin" is recited herein and in the claims, it is intended to include all of the polymerized materials which are obtained by the polymerization of the fluorocarbons including perfluorocarbons and partially substituted fluorocarbons, e.g., the chloro, bromo, or nitro-substituted fluorocarbons.

What is claimed is:

1. The combination in a bearing, of a section of a ball having a polished surface, a sleeve about said ball in spaced relation thereto, a pair of metal members disposed between said sleeve and said ball, a low friction resin material between the polished surface of said ball and said metal elements, and means bonding said material to said metal members, said low friction resin material being clothlike and containing filaments of Teflon.

2. The combination in a bearing, of a section of a ball having a polished surface, a sleeve about said ball in spaced relation thereto, a pair of metal members disposed between said sleeve and said ball, a low friction resin material between the polished surface of said ball and said metal elements, and means bonding said material to said metal members, said low friction resin material being clothlike and containing filaments of Teflon, said clothlike material being retained under pressure against the ball surface through the deformation of said sleeve.

3. A bearing assembly comprising a ring member, a round bearing element in said ring member having a spherical shaped outer surface spaced from said ring member, a sleeve of organic polymeric material surrounding the spherical outer surface of said round bearing element, said sleeve having a low friction surface in sliding engagement with said spherical surface, and a metal annular shaped member between said sleeve and said ring having an inner spherical surface conforming substantially to the spherical shaped outer surface of said round bearing element and pressing said low friction surface into intimate contact with said spherical surface, said sleeve being bonded to said annular shaped member and said annular shaped member being secured to said ring member.

4. A bearing assembly as set forth in claim 3 wherein the low friction surface of said sleeve comprises fibers and wherein the normal uncompressed thickness of said sleeve is greater than the clearance space between the inner spherical surface of said annular shaped member and the spherical shaped outer surface of said round bearing element.

5. A bearing assembly as set forth in claim 3 wherein said low friction surface comprises polytetrafluoroethylene fibers.

6. A bearing assembly as set forth in claim 3 wherein said ring member is a metal ring having an inner cylindrical bore and said annular shaped member has an outer cylindrical surface closely fitted within said bore.

7. A bearing assembly as set forth in claim 6 including flange means on one of said members for locking said members against axial movement relative to one another.

8. The bearing assembly as set forth in claim 3 wherein said annular shaped member comprises a pair of metal washer-like elements each having an inner spherical surface conforming substantially to the spherical shaped outer surface of said round bearing element, said washer-like elements being fixed within said ring member to maintain the inner spherical surfaces thereof against axial movement away from said round bearing element.

9. The bearing assembly as set forth in claim 3 wherein said annular shaped member comprises a pair of semi-cylindrical elements each having a truncated spherical surface conforming substantially to the spherical shaped outer surface of said round bearing element, said elements being fixed within said ring member to maintain the inner spherical surfaces thereof against movement away from said round bearing element.

10. The bearing assembly as set forth in claim 3 wherein said annular shaped member has an outer cylindrical surface closely fitted within said ring member, the low friction surface of said sleeve comprises polytetrafluoroethylene fibers with the normal uncompressed thickness of said sleeve being greater than the clearance space between the inner spherical surface of said annular shaped member and the spherical shaped outer surface of said round bearing element, and flange means for locking said annular shaped member within said ring member.

11. A method for manufacturing a bearing comprising the steps of positioning a bearing element having a spherical shaped outer surface within a flexible bearing sleeve surrounded by a metal annular shaped backing member which conforms said flexible bearing sleeve to said spherical surface under pressure, the surface of said backing member engaging said bearing sleeve conforming substantially to said spherical surface, the face of said bearing sleeve engaging said spherical surface being a low friction resin surface and the other face of said bearing sleeve being a bondable surface bondable to said backing member under heat and pressure, and applying heat to said bearing sleeve and cooling the bearing sleeve to bond the bondable surface to the backing member and establish an intimate sliding bearing engagement between said low friction resin surface and spherical surface.

12. A bearing assembly as set forth in claim 3 wherein said sleeve has a thermosetting resin backing which forms the bond with said annular shaped member, and wherein the low friction surface of said sleeve comprises polytetrafluoroethylene fibers.

13. A bearing assembly as set forth in claim 12 wherein said polytetrafluoroethylene fibers form a cloth secured to said resin backing.

(References on following page)

References Cited by the Examiner

UNITED STATES PATENTS

| | | | |
|---|---|---|---|
| 1,881,601 | 10/1932 | Huffered et al. | |
| 1,943,631 | 1/1934 | Skillman | 29—149.5 |
| 1,960,956 | 5/1934 | Riedel | 29—149.5 |
| 1,989,116 | 1/1935 | Strauss | 387—90 |
| 2,027,560 | 1/1936 | Skillman | 29—149.5 |
| 2,669,491 | 2/1954 | Haller | 308—72 |
| 2,765,023 | 10/1956 | Flagg et al. | 54—33.1 |
| 2,814,538 | 11/1957 | Connolly | 308—72 |
| 2,838,436 | 6/1958 | Clingman | 308—238 |
| 2,919,150 | 12/1959 | Baker. | |
| 2,998,397 | 8/1961 | Riesing | 308—238 |

DON A. WAITE, *Primary Examiner.*

FRANK R. SUSKO, ROBERT C. RIORDON,
*Examiners.*

UNITED STATES PATENT OFFICE
Certificate of Correction

Patent No. 3,232,682                                                        February 1, 1966

Charles S. White

It is hereby certified that error appears in the above numbered patent requiring correction and that the said Letters Patent should read as corrected below.

In the sheet of drawings, strike out Figs. 1, 2 and 3, and insert instead the drawings as shown below:

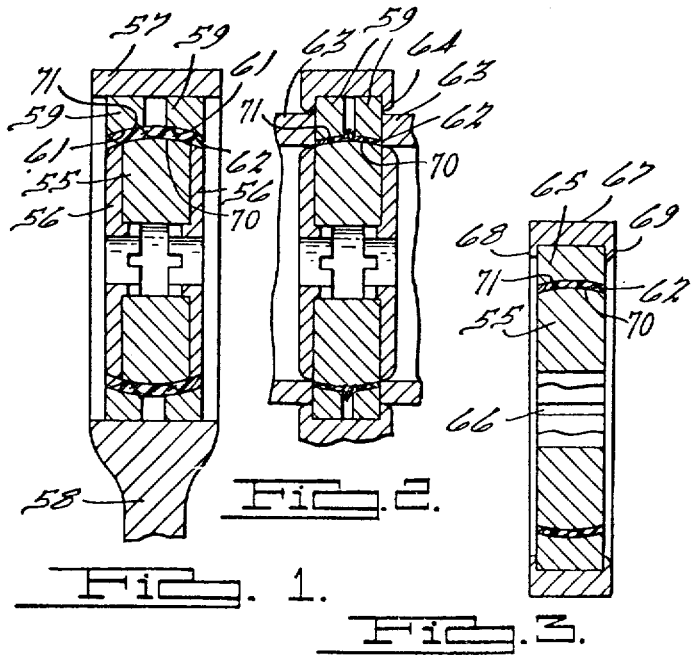

Signed and sealed this 12th day of April 1966.

[SEAL]

Attest:
ERNEST W. SWIDER,
*Attesting Officer.*

EDWARD J. BRENNER,
*Commissioner of Patents.*